United States Patent

Shouzaki et al.

[11] Patent Number: 6,100,352
[45] Date of Patent: *Aug. 8, 2000

[54] PROCESS FOR PRODUCING POLYMER

[75] Inventors: Hajime Shouzaki; Norio Tomotsu, both of Ichihara, Japan

[73] Assignee: Idemitsu Kosan Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/859,030

[22] Filed: May 20, 1997

[30] Foreign Application Priority Data

May 29, 1996 [JP] Japan .................................. 8-135417

[51] Int. Cl.[7] ...................................................... C08F 4/52
[52] U.S. Cl. ........................ 526/132; 526/134; 526/153; 526/160; 526/165; 526/346; 526/943
[58] Field of Search ..................................... 526/132, 133, 526/160, 165, 153, 346, 134, 943

[56] References Cited

U.S. PATENT DOCUMENTS

| | | | |
|---|---|---|---|
| 5,142,005 | 8/1992 | Albizzati et al. | 526/165 |
| 5,378,777 | 1/1995 | Watanabe et al. | 526/132 |
| 5,461,127 | 10/1995 | Naganuma et al. | 526/132 |
| 5,510,434 | 4/1996 | Takeuchi | 526/132 |
| 5,536,797 | 7/1996 | Nickias et al. | 526/170 |
| 5,596,055 | 1/1997 | Aoyama et al. | 526/132 |

FOREIGN PATENT DOCUMENTS

| | | |
|---|---|---|
| 0 505 972 | 9/1992 | European Pat. Off. . |
| 0 739 905 | 10/1996 | European Pat. Off. . |

*Primary Examiner*—David W. Wu
*Assistant Examiner*—Roberto Rabago
*Attorney, Agent, or Firm*—Oblon, Spivak, McClelland, Maier & Neustadt, P.C.

[57] ABSTRACT

A styrene type monomer is polymerized by use of a catalyst consisting of (a) a transition metal compound, (b1) a compound capable of forming an ionic compound by reacting with the transition metal compound, and if necessary (d) an alkylating agent, which comprises subjecting to a polymerization reaction a monomer to which (c) an oxygen-containing compound having a branched alkyl group, or (c) said oxygen-containing compound and (d) all or a part of an alkylating agent have previously been added, or by a process for producing a polymer in which a monomer particularly a styrene type monomer is polymerized by use of a catalyst consisting of (a) a transition metal compound, (b1) a compound capable of forming an ionic compound by reacting with the transition metal compound, (b2) a specific oxygen-containing compound, and if necessary (d) an alkylating agent, which comprises subjecting to a polymerization reaction a monomer to which (c) an oxygen-containing compound having a branched alkyl group, or (c) said oxygen-containing compound and (d) all or a part of an alkylating agent have previously been added.

22 Claims, No Drawings

PROCESS FOR PRODUCING POLYMER

BACKGROUND OF THE INVENTION

1. Field of the Invention

The present invention relates to a process for producing a polymer and in particular to a process for producing a polymer such as styrene type polymer, olefin type copolymer etc. having a high degree of a syndiotactic structure efficiently with high activity.

2. Description of the Related Arts

Recently, a catalyst consisting of a transition-metal compound particularly a titanium compound and methylaluminoxane is used to polymerize a styrene type monomer to obtain a styrene type polymer with a syndiotactic structure (also referred to herein after as "SPS") (Japanese Patent Laid-Open Publication No. 187,708/1987).

In the production of a styrene type polymer as described above, it is also proposed that a coordination complex compound consisting of an anion or a cation having a plurality of groups bound to a metal is used to produce a styrene type polymer with a syndiotactic structure efficiently without using aluminoxane which is expensive and used in a large amount (Japanese Patent Laid-Open Publication Nos. 415,573/1990 and 415,574/1990).

It is further proposed that in the production of a styrene type monomer, an alkylating agent and a reaction product between water and a straight-chain alkyl aluminium whose alkyl moiety has 2 or more carbons are added to decrease the molecular weight of a polymer to be formed without reducing polymerization activity (Japanese Patent Laid-Open Publication No. 316,215/1995).

Activity expression is conventionally not sufficient in the polymerization of a styrene type monomer when the catalyst consisting of a titanium compound and aluminoxane as described above is used, and it is therefore necessary to employ an excess amount of aluminoxane in order to improve activity. In such case, however, a large amount of metals remain in the resulting polymer and if left as it is, there will occur bad influences such as deterioration of the mechanical properties of the polymer, which makes a high degree of technical skill essential for post-treatment. Further, even if an excess amount of aluminoxane is used, there is another problem that the activity does not exceed a certain level. If aluminoxane is not used and a coordination complex compound consisting of an anion or cation having a plurality of groups bound to a metal is used, the amount of metals in the resulting polymer can be reduced, but low activity is the problem. Therefore, it is desired to develop a production process in which a polymer can be obtained with high catalyst activity in case these catalyst systems are used.

SUMMARY OF THE INVENTION

As a result of their eager research under these circumstances, the present inventors found that in the polymerization of a polymer by using a transition metal compound, a compound capable of forming an ionic complex by reacting with the transition metal compound or an oxygen-containing compound such as aluminoxane, and an alkylating agent, a polymer can be produced with high activity by using as a starting material a monomer to which the same compound as said oxygen-containing compound or an oxygen-containing compound having a different structure of alkyl group from that of said oxygen-containing compound has previously been added.

The present invention is completed on the basis of the above finding. That is, the essence of the present invention is as follows:

1. A process for producing a polymer by polymerizing a monomer in the presence of a catalyst comprising (a) a transition metal compound and (b11) a compound capable of reacting with said transition metal compound to form an ionic complex which comprises polymerizing a monomer having (c) a component comprising at least on of an oxygen-containing compound represented by general formula (I):

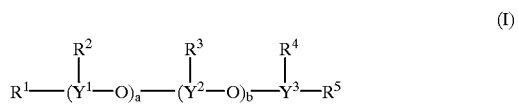

wherein $R^1$ to $R^5$, which may be the same or different, independently represent an alkyl group containing from 1 to 8 carbon atoms, provided that at least one of $R^1$ to $R^5$ must have a branched structure; $Y^1$ to $Y^3$, which may be the same or different, independently represent an element of the group 13 of the periodic table; and a and b independently represent a number of 0 to 50, and the sum of a and b is 1 or more, and an oxygen-containing compound represented by general formula (II):

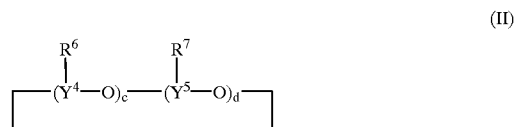

wherein $R^6$ and $R^7$, which may be the same or different, independently represent an alkyl group containing from 1 to 8 carbon atoms, provided that at least one of $R^6$ and $R^7$ must have a branched structure; $Y^4$ and $Y^5$, which may be the same or different, independently represent an element of the group 13 in the periodic table; and c and d independently represent a number of from 0 to 50, and the sum of c and d is 1 or more, previously added thereto.

2. A process for producing a polymer by polymerizing a monomer in the presence of a catalyst comprising (a) a transition metal compound, (b1) a compound capable of reacting with said transition metal compound to form an ionic complex, and (b2) a component comprising at least one of an oxygen-containing compound represented by general formula (III):

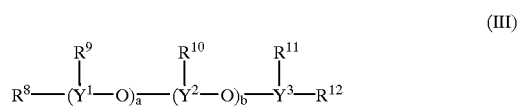

wherein $R^8$ to $R^{12}$, which may be the same or different, independently represent an alkyl group containing from 1 to 8carbon atoms; $Y^1$ to $Y^3$, which may be the same or different, independently represent an element of the group 13 of the periodic table; and a and b independently represent a number of from 0 to 50, and the sum of a and b is 1 or more, and an oxygen-containing compound represented by general formula (IV):

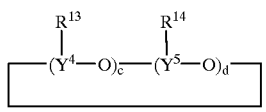

(IV)

wherein $R^{13}$ and $R^{14}$, which may be the same or different, independently represent an alkyl group containing from 1 to 8 carbon atoms; $Y^4$ and $Y^5$, which may be the same or different, independently represent an element of the group 13 in the periodic table; and c and d independently represent a number of from of 0 to 50, and the sum of c and d is 1 or more, which comprises polymerizing a monomer having (c) a component comprising at least one of an oxygen-containing compound represented by general formula (I)

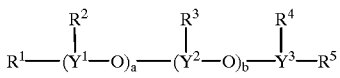

(I)

wherein $R^1$ to $R^5$, which may be the same or different, independently represent an alkyl group containing from 1 to 8 carbon atoms, provided that at least one of $R^1$ to $R^5$ must have a branched structure; $Y^1$ to $Y^3$, which may be the same or different, independently represent an element of the group 13 of the periodic table; and a and b independently represent a number of 0 to 50, and the sum of a and b is 1 or more, and an oxygen-containing compound represented by general formula (II):

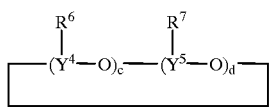

(II)

wherein $R^6$ and $R^7$, which may be the same or different, independently represent an alkyl group containing from 1 to 8 carbon atoms, provided that at least one of $R^6$ and $R^7$ must have a branched structure; $Y^4$ and $Y^5$, which may be the same or different, independently represent an element of the group 13 of the periodic table; and c and d independently represent a number of from 0 to 50, and the sum of c and d is 1 or more, previously added thereto.

3. A process for producing a polymer by polymerizing a monomer in the presence of a catalyst comprising (a) a transition metal compound and (b2) a component comprising at least one of an oxygen-containing compound represented by general formula (III)

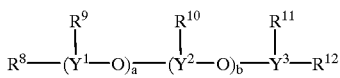

(III)

wherein $R^8$ to $R^{12}$, which may be the same or different, independently represent an alkyl group containing from 1 to 8 carbon atoms; $Y^1$ to $Y^3$, which may be the same or different, independently represent an element of the group 13 of the periodic table; and a and b independently represent a number of from 0 to 50, and the sum of a and b is 1 or more, and an oxygen-containing compound represented by general formula (IV):

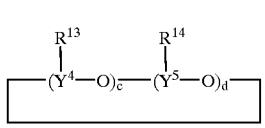

(IV)

where $R^{13}$ and $R^{14}$, which may be the same or different, independently represent an alkyl group containing from 1 to 8carbon atoms; $Y^4$ and $Y^5$ which may be the same or different, independently represent an element of the group 13 of the periodic table; and c and d independently represent a number of from of 0 to 50, and the sum of c and d is 1 or more, which comprises polymerizing a monomer having (c) a component comprising at least one of an oxygen-containing compound represented by general formula (I)

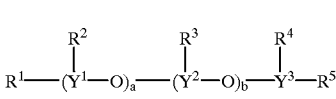

(I)

wherein $R^1$ to $R^5$, which may be the same or different, independently represent an alkyl group containing from 1 to 8 carbon atoms, provided that at least one of $R^1$ to $R^5$ must have a branched structure; $Y^1$ to $Y^3$, which may be the same or different, independently represent an element of the group 13 of the periodic table; and a and b independently represent a number of 0 to 50, and the sum of a and b is 1 or more, and an oxygen-containing compound represented by the general formula (II):

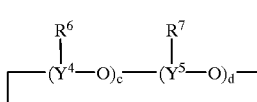

(II)

wherein $R^6$ and $R^7$, which may be the same or different, independently represent an alkyl group containing from 1 to 8 carbon atoms, provided that at least one of $R^6$ and $R^7$ must have a branched structure; $Y^4$ and $Y^5$, which may be the same or different, independently represent an element of the group 13 of the periodic table; and c and d independently represent a number of from 0 to 50, and the sum of c and d is 1 or more, previously added thereto.

DETAILED DESCRIPTION OF THE INVENTION

Hereinafter, the present invention is described in detail.

As the transition metal compound (a) used in the present invention, various compounds can be used, but compounds represented by the following general formula (V) or (VI) are usually used:

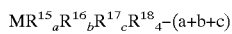 (V)

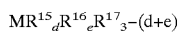 (VI)

where M represents the metals of groups 3 to 6 in the periodic table or lanthanum series metals; $R^{15}$, $R^{16}$, $R^{17}$ and $R^{18}$ independently represent an alkyl group, alkoxy group, aryl group, cyclopentadienyl group, alkylthio group, substituted cyclopentadienyl group, indenyl group, substituted indenyl group, fluorenyl group, amino group, amide group, acyloxy group, phosphide group, halogen atom and chelate agent; a, b and c independently represent an integer of 0 to 4, and d and e independently represent an integer of 0 to 3; and any two of $R^{15}$ to $R^{18}$ may form a complex which is crosslinked with $CH_2$, $Si(CH_3)_2$ or the like are included.

As the metals of groups 3 to 6 in the periodic table or lanthanum series metals represented by M, the metals of group 4, particularly titanium, zirconium, hafnium etc. are preferably employed.

The titanium compounds include various compounds e.g. at least compound selected from the group selected from those titanium compounds and titaniumchelate compounds represented by the general formula (VII) or (VIII):

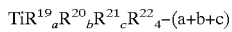 (VII)

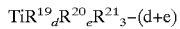 (VIII)

where $R^{19}$, $R^{20}$ $R^{21}$ and $R^{22}$ independently represent a hydrogen atom, $C_1$ to $C_{20}$ alkyl group, $C_1$ to $C_{20}$ alkoxy group, $C_6$ to $C_{20}$ aryl group, alkylaryl group, arylalkyl group, $C_6$ to $C_{20}$ aryloxy group, $C_1$ to $C_{20}$ acyloxy group, $C_1$ to $C_{50}$ amino ground, amide group, phosphide group, cyclopentadienyl group, substituted cyclopentadienyl group, indenyl group, substituted indenyl group, fluorenyl group, alkylthio group, arylthio group, chelate agent and halogen atom; a, b and c independently represent an integer of 0 to 4; d and e independently represent an integer of 0 to 3; and any two of $R^{19\ 22}$ may form a complex which is crosslinked with $CH_2$, $Si(CH_3)_2$ etc. are included.

$R^{19}$, $R^{20}$, $R^{21}$ and $R^{22}$ in the above general formula (VII) or (VIII) independently represent a hydrogen atom, $C_1$ to $C_{20}$ alkyl group (specifically, a methyl group, ethyl group, propyl group, butyl group, amyl group, isoamyl group, isobutyl group, octyl group, 2-ethylhexyl group etc.), $C_1$ to $C_{20}$ alkoxy group (specifically, a methoxy group, ethoxy group, propoxy group, butoxy group, amyloxy group, hexyloxy group, 2-ethylhexyloxy group etc.), $C_6$ to $C_{20}$ aryl group, alkylaryl group, arylalkyl group (specifically, a phenyl group, tolyl group, xylyl group, benzyl group etc.), $C_6$ to $C_{20}$ aryloxy group (specifically, a phenoxy group etc.), $C_1$ to $C_{20}$ acyloxy group (specifically, an acetoxy group, benzoyloxy group, butylcarbonyloxy group, heptadecyl carbonyloxy group etc.), $C_1$ to $C_{20}$ amino group (specifically, a dimethylamino group, diethylamino group, diphenylamino group, bistrimethylsilyl group etc.), amide group (specifically, an acetamide group, ethylamide group, diphenylamide group, methylphenylamide group etc.), phosphide group (specifically, a dimethylphosphide group, diethylphosphide group, diphenylphosphide group etc.), cyclopentadienyl group, substituted cyclopentadienyl group (specifically, methylcyclopentadienyl group, 1,2-dimethyl cyclopentadienyl group, tetramethylcyclopentadienyl group, pentamethylcyclopentadienyl group, etc.), indenyl group, substituted indenyl group (specifically, a methylindenyl group, dimethylindenyl group, tetramethylindenyl group, hexamethylindenyl group, 4,5,6,7-tetrahydro-1,2,3,-trimethylindenyl group etc.), fluorenyl group (specifically, a methylfluorenyl group, dimethylfluorenyl group, tetramethylfluorenyl group, octamethylfluorenyl group etc.), alkylthio group (specifically, a methylthio group, ethylthio group, butylthio group, amylthio group, isoamylthio group, isobutylthio group, octylthio group, 2-ethylhexylthio group etc.), arylthio group (specifically, a phenylthio group, p-methylphenylthio group, p-methoxyphenylthio group), a chelate agent (specifically, 2,2'-thiobis(4-methyl-6-t-butylphenoxy) group etc.) and halogen atom (specifically, chlorine, bromine, iodine, fluorine). The groups $R^{19}$, $R^{20}$, $R^{21}$ and $R^{22}$ may be the same or different.

Further preferable titanium compounds include those represented by the general formula (IX):

TiRXYZ (IX) where R represents a cyclopentadienyl group, substituted cyclopentadienyl group, indenyl group, substituted indenyl group, fluorenyl group etc.; X, Y and Z independently represent a hydrogen atom, $C_1$ to $C_{20}$ alkyl group, $C_1$ to $C_{20}$ alkoxy group, $C_6$ to $C_{20}$ aryl group, alkylaryl group, arylalkyl group, $C_6$ to $C_{20}$ aryloxy group, $C_1$ to $C_{20}$ acyloxy group, $C_1$ to $C_{50}$ amino group, amide group, phosphide group, alkylthio group, arylthio group and halogen atom. In this formula, compounds having one of X, Y and Z crosslinked to R by $CH_2$, $SiR_2$ etc. are also included. The substituted cyclopentadienyl group represented by R in this formula include e.g. a cyclopentadienyl group substituted with at least one $C_1$ to $C_6$ alkyl group, specifically, a methyl cyclopentadienyl group; 1,2-dimethylcyclopentadienyl group; 1,2,4-trimethylcyclopentadienyl group; 1,2,3,4-tetramethyl cyclopentadienyl group; trimethylsilylcyclopentadienyl group; 1,3-di(trimethylsilyl)cyclopentadienyl group; tert-butylcyclopentadienyl group; 1,3-di(tert-butyl) cyclopentadienyl group; and pentamethyl cyclopentadienyl group. X, Y and Z independently represent a hydrogen atom, $C_1$ to $C_{20}$ alkyl group (specifically, a methyl group, ethyl group, propyl group, butyl group, amyl group, isoamyl group, isobutyl group, octyl group, 2-ethyl hexyl group etc.), $C_1$ to $C_{20}$ alkoxy group (specifically, a methoxy group, ethoxy group, propoxy group, butoxy group, amyloxy group, hexyloxy group, 2-ethylhexyloxy group etc.), $C_6$ to $C_{20}$ aryl group, alkylaryl group, arylalkyl group (specifically, a phenyl group, tolyl group, xylyl group, benzyl group etc.), $C_6$ to $C_{20}$ aryloxy group (specifically, a phenoxy group etc.), $C_1$ to $C_{20}$ acyloxy group (specifically, an acetoxy group, benzoyloxy group, butylcarbonyloxy group, heptadecyl carbonyloxy group etc.), $C_1$ to $C_{50}$ amino group (specifically, a dimethylamino group, diethylamino group, diphenylamino group, bistrimethylsilylamino group etc.), amide group (specifically, an acetamide group, ethylamide group, diphenylamide group, methylphenylamide group etc.), phosphide group (specifically, a dimethylphosphide group, diethylphosphide group, diphenylphosphide group etc.), alkylthio group (specifically, a methylthio group, ethylthio group, butylthio group, amylthio group, isoamylthio group, isobutylthio group, octylthio group, 2-ethylhexylthio group etc.), arylthio group (specifically, a phenylthio group, p-methyl phenylthio group, p-methoxy phenylthio group) and halogen atom (specifically, chlorine, bromine, iodine, fluorine).

Examples of titanium compounds represented by the general formula (IX) are
cyclopentadienyltrimethyltitanium;
cyclopentadienyltriethyltitanium;
cyclopentadienyltripropyltitanium;
cyclopentadienyltributyltitanium;
methylcyclopentadienyltrimethyltitanium;
1,2-dimethylcyclopentadienyltrimethyltitanium;
1,2,4-trimethylcyclopentadienyltrimethyltitanium;
1,2,3,4-tetramethylcyclopentadienyltrimethyltitanium;

pentamethylcyclopentadienyltrimethyltitanium;
pentamethylcyclopentadienyltriethyltitanium;
pentamethylcyclopentadienyltripropyltitaniu;
pentamethylcyclopentadienyltributyltitanium;
cyclopentadienylmethyltitaniumdichloride;
cyclopentadienylethyltitaniumdichloride;
pentamethylcyclopentadienylmethyltitaniumdichloride;
pentamethylcyclopentadienylethyltitaniumdichloride;
cyclopentadienyldimethyltitaniummonochloride;
cyclopentadienyldiethyltitaniummonochloride;
cyclopentadienyltitaniumtrimethoxide;
cyclopentadienyltitaniumtriethoxide;
cyclopentadienyltitaniumtripropoxide;
cyclopentadienyltitaniumtriphenoxide;
pentamethylcyclopentadienyltitaniumtrimethoxide;
pentamethylcyclopentadienyltitaniumtriethoxide;
pentamethylcyclopentadienyltitaniumtripropoxide;
pentamethylcyclopentadienyltitaniumtributoxide;
pentamethylcyclopentadienyltitaniumtriphenoxide;
cyclopentadienyltitaniumtrichloride;
pentamethylcyclopentadienyltitaniumtrichloride;
pyclopentadienylmethoxytitaniumdichloride;
cyclopentadienyldimethoxytitaniumchloride;
pentamethylcyclopentadienylmethoxytitaniumdichloride;
cyclopentadienyltribenzyltitanium;
pentamethylcyclopentadienylmethyldiethoxytitanium;
indenyltitaniumtrichloride; indenyltitaniumtrimethoxide;
indenyltitaniumtriethoxide; 4,5,6,7-tetrahydroindenyl
aniumtrimethoxide; indenyltrimethyltitanium; indenyl-
  tribenzyltitanium; 1,2,3,4,5,6,7,8-
  octahydrofluorenyltitaniumtrimethoxide;
(t-butylamide)dimethyl(tetramethyl-η-cyclopentadienyl)
  silanetitaniumdichloride;
(t-butylamide)dimethyl(tetramethyl-η$^5$-cyclopentadienyl)
  silanetitaniumdimethyl;
(t-butylamide)dimethyl(tetramethyl-η$^5$-cyclopentadienyl)
  silanetitaniumdimethoxide;
pentainethylcyclopentadi-
  enyldiethylamidetitaniumdichloride;
pentamethylcyclopentadienyl-
  diphenylamidetitaniumdichloride;
pentamethylcyclopentadienyldiphenylphosphidetitanium
dichloride; pentamethylcyclopentadienyldiethylamide
titaniumdimethoxide; pentamethylcyclopentadienyl
diphenylamidetitaniumdimethoxide;
pentamethylcyclopentadienyldiphenylphosphidetitanium
  dimethoxide; pentamethylcyclopentadienyltrisbenzoyl
  titanium etc.

Out of these titanium compounds, halogen-free compounds are preferable, and in particular, the titanium compounds having one π-electron type ligand as described above are preferred.

Further, the titanium compounds which may be used include condensed titanium compounds represented by the general formula (X):

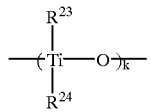

(X)

where $R^{23}$ and $R^{24}$ independently represent a halogen atom, $C_1$ to $C_{20}$ alkoxy group and acyloxy group; and k is 2 to 20. Said titanium compounds may be a complex formed together with an ester, ether etc.

The trivalent titanium compounds represented by the general formula (VIII) include typically titanium trihalide such as titaniumtrichloride and cyclopentadienyl titanium compounds such as cyclopentadienyltitaniumdichloride as well as those obtained by reducing titanium tetrachloride compounds. These trivalent titanium compounds may form complexes with an ester, ether etc.

As the transition metal compounds, the zirconium compounds include tetrabenzylzirconium, zirconium tetraethoxide, zirconiumtetrabutoxide, bisindenylzirconium dichloride, triisopropoxyzirconiumchloride, zirconium benzyldichloride, tributoxyzirconiumchloride etc., and the hafnium compounds include tetrabenzylhafnium, hafnium tetraethoxide, hafniumtetrabutoxide etc., and the vanadium compounds include vanadylbisacetylacetate, vanadyl triacetylacetate, triethoxyvanadyl, tripropoxyvanadyl etc. Out of these transition metal compounds, titanium compounds are particularly preferable.

Other transition metal compounds as component (a) include a transition metal compounds having two conjugated πelectrons, for example at least one compound selected from the group consisting of transition metal compounds represented by the general formula (XI):

where $M^1$ represents titanium, zirconium and hafnium, $R^{25}$ and $R^{26}$ independently represent a cyclopentadienyl group, substituted cyclopentadienyl group, indenyl group and fluorenyl group; and $R^{27}$ and $R^{28}$ independently represent a hydrogen atom, halogen atom, $C_1$ to $C_{20}$ hydrocarbon group, $C_1$ to $C_{20}$ alkoxy group, amino group and $C_1$ to $C_{20}$ thioalkoxy group, provided that $R^{25}$ and $R^{26}$ may be crosslinked to a $C_1$ to $C_5$ hydrocarbon group, $C_1$ to $C_{20}$ alkylsilyl group containing 1 to 5 silicon atoms, or $C_1$ to $C_{20}$ hydrocarbon group containing 1 to 5 germanium atoms.

In the above general formula (XI), $R^{25}$ and $R^{26}$ independently represent a cyclopentadienyl group, substituted cyclopentadienyl group (specifically, a methyl cyclopentadienyl group; 1,3-dimethylcyclopentadienyl group; 1,2,4-trimethylcyclopentadienyl group; 1,2,3,4-tetramethyl cyclopentadienyl group; pentamethylcyclopentadienyl group; trimethylsilylcyclopentadienyl group; 1,3-di(trimethylsilyl) cyclopentadienyl group; 1,2,4-tri(trimethylsilyl) cyclopentadienyl group; tert-butyl cyclopentadienyl group; 1, 3-di (tert-butyl) cyclopentadienyl group; 1,2,4-tri (tert-butyl) cyclopentadienyl group etc.); indenyl group, substituted indenyl group (specifically, a methylindenyl group; dimethylindenyl group; trimethylindenyl group etc.), fluorenyl group or substituted fluorenyl group (for example, a methyl fluorenyl group), and $R^{25}$ and $R^{26}$ may be the same or different, and $R^{25}$ and $R^{26}$ may be crosslinked by a $C_1$ to $C_5$ alkylidene group (specifically, a methine group, ethylidene group, propylidene group, dimethylcarbyl group etc.) or by a $C_1$ to $C_{20}$ alkylsilyl group containing 1 to 5 silicon groups (specifically, a dimethylsilyl group, diethylsilyl group, dibenzylsilyl group etc.). $R^{27}$ and $R^{28}$ are as defined above, and more specifically, they independently represent a hydrogen atom, $C_1$ to $C_{20}$ alkyl group (methyl group, ethyl group, propyl group, n-butyl group, isobutyl group, amyl group, isoamyl group, octyl group, 2-ethylhexyl group etc.), $C_6$ to $C_{20}$ aryl group (specifically, a phenyl group, naphthyl group etc.), $C_7$ to $C_{20}$ arylalkyl group (specifically, a benzyl group etc.), $C_1$ to $C_{20}$ alkoxy group (specifically, a methoxy group, ethoxy group, propoxy group, butoxy group, amyloxy group, hexyloxy group, octyloxy group, 2-ethyl hexyloxy group etc.), $C_6$ to $C_{20}$ aryloxy group (specifically, a phenoxy group), amino group, and $C_1$ to $C_{20}$ thioalkoxy group.

Examples of transition metal compounds represented by the general formula (XI) include biscyclopentadienyl titaniumdimethyl; biscyclopentadienyltitaniumdiethyl; biscyclopentadienyltitaniumdipropyl; biscyclopentadienyltitaniumdibutyl; bis(methylcyclopentadienyl)titaniumdimethyl; bis(tert-butylcyclopentadienyl)titaniumdimethyl; bis (1, 3dimhethylcyclpentadienyl)titaniumdimethyl; bis(1,3-di-tert-butylcyclopentadienyl)titaniumdimethyl; bis (1,2,4-trimethylcyclopentaienyl)titaniumdimethyl; bis(1,2,3,4-tetramethylcyclopentadienyl)titaniumdimethyl; bis (trimethylsilylcyclopentadienyl) titaniumdimethyl; bis(1,3-di(trimethylsilyl) cylopentadienyl) titanium dimethyl; bis(1,2,4-tri((trimethylsilyl)cyclopentadienyl) titaniumdimethyl; bisindenyltitaniumdimethyl; bisfluorenyltitaniumdimethyl; methylenebiscyclopentadienyl titaniumdimethyl; ethylidenebiscyclopentadienyltitanium dimethyl; methylenebis(2,3,4,5-tetramethyl cyclopentadienyl) titaniumdimethyl; ethylidenebis(2,3,4,5-tetramethylcyclopentadienyl)titanium dimethyl; dimethylsilylbis (2,3,4, 5-tetramethyl cyclopentadienyl)titaniumdimethyl; methylenebisindenyltitaniumdimethyl; ethylidenebisindenyltitaniumdimethyl; dimethylsilylbisindenyltitaniumdimethyl; methylenebisfluorenyltitaniumdimethyl; ethylidenebisfluorenyltitaniumdimethyl; dimethylsilylbisfluorenyltitaniumdimethyl; methylene (tert-butylcyclopentadieny)(cyclopentadienyl) titaniumdimethyl; methylene (cyclopentadienyl) (indenyl) titaniumdimethyl; ethylidene(cyclopentadienyl)(indenyl) titaniumdimethyl; dimethylsilyl(cyclopentadienyl) (indenyl) titaniumdimethyl; methylene(cyclopentadienyl) (fluorenyl) titaniumdimethyl; ethylidene(cyclopentadienyl) (fluorenyl) titaniumdimethyl; dimethylsilyl (cyclopentadienyl) (fluorenyl)titaniumdimethyl; methylene (indenyl)(fluorenyl) titaniumdimethyl; ethylidene(indenyl) (fluorenyl)titanium dimethyl; dimethylsilyl(indenyl) (fluorenyl)titanium dimethyl; biscyclopentadienyltitaniumdibenzyl; bis(tert-butyl-cyclocylopentadienyl)titaniumdibenzyl; bis(methylcyclopentadienyl)titaniumdibenzyl; bis(1,3-dimethylcyclopentadienyl)titaniumdibenzyl; bis(1,2,4-trimethylcyclopentadienyl)titaniumdibenzyl; bis(1,2,3,4-tetramethylcyclopentadienyl)titaniumdibenzyl; bispentamethylcyclopentadienyltitaniumdibenzyl; bis(trimethylsilylcyclopentadienyl)titaniumdibenzyl; bis(1,3-di-(trimethylsilyl)cyclopentadienyl)titanium dibenzyl; bis(1,2,4-tri(trimethylsilyl)cyclopentadienyl) titaniumdibenzyl; bisindenyltitaniumdibenzyl; bisfluorenyltitaniumdibenzyl; methylenebiscyclopentadienyl titaniumdibenzyl; ethylidenebiscyclopentadienyltitanium dibenzyl; methylenebis(2,3,4,5-tetramethyl cyclopentadienyl)titaniumdibenzyl; ethylidenebis(2,3,4,5-tetramethylcyclopentadienyl)titaniumdibenzyl; dimethylsilylbis(2,3,4,5-tetramethylcyclopentadienyl) titaniumdibenzyl; methylenebisindenyltitaniumdibenzyl; ethylidenebisindenyltitaniumdibenzyl; dimethylsilylbisindenyltitaniumdibenzyl; methylenebisfluorenyltitaniumdibenzyl; ethylidenebisfluorenyltitaniumdibenzyl; dimethylsilylbisfluorenyltitaniumdibenzyl; methylene(cyclopentadienyl)(indenyl)titaniumdibenzyl; ethylidene(cyclopentadienyl)(indenyl)titaniumdibenzyl; dimethylsilyl(cyclopentadienyl)(indenyl)titanium dibenzyl; methylene(cyclopentadienyl)(fluorenyl)titaniumdibenzyl; ethylidene(cyclopentadienyl)(fluorenyl)titaniumdibenzyl; dimethylsilyl(cyclopentadienyl)(fluorenyl)titanium dibenzyl; methylene(indenyl)(fluorenyl)titaniumdibenzyl; ethylidene(indenyl)(fluorenyl)titaniumdibenzyl; dimethylsilyl(indenyl)(fluorenyl)titaniumdibenzyl; biscyclopentadienyltitaniumdimethoxide; biscyclopentadienyltitaniumdiethoxide; biscyclopentadienyltitaniumdipropoxide; biscyclopentadienyltitaniumdibutoxide; biscyclopentadienyltitaniumdiphenoxide; bis(methylcyclopentadienyl)titaniumdimethoxide; bis(1,3-dimethylcyclopentadienyl)titaniumdimethoxide; bis(1,2,4-trimethylcyclopentadienyl)titaniumdimethoxide; bis(1,2,3,4-tetramethylcyclopentadienyl)titanium dimethoxide; bispentamethylcyclopentadienyltitanium dimethoxide; bis(trimethylsilylcyclopentadienyl)titanium dimethoxide; bis(1,3-di(trimethylsilyl)cyclopentadienyl) titaniumdimethoxide; bis(1,2,3,4-tri(trimethylsilyl) cyclopentadienyl)titaniumdimethoxide; bisindenyltitaniumdimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethyl cyclopentadienyl)titaniumdimethoxide; ethylidenebis(2,3,4,5-tetramethylcyclopentadienyl)titanium dimethoxide; dimethylsilylbis(2,3,4,5-tetramethyl cyclopentadienyl)titaniumdimethoxide; methylenebisindenyl titaniumdimethoxide; methylenebis(methylindenyl)titanium dimethoxide; ethylidenebisindenyltitaniumdimethoxide; dimethylsilylbisindenyltitaniumdimethoxide; methylenebisfluorenyltitaniumdimethoxide; methylenebis(methylfluorenyl)titaniumdimethoxide; ethylidenebisfluorenyltitaniumdimethoxide; dimethylsilylbisfluorenyltitaniumdimethoxide; methylene (cyclopentadienyl) (indenyl) titaniumdimethoxide; ethylidene(cyclopentadienyl)(indenyl)titaniumdimethoxide; dimethylsilyl (cyclopentadienyl) (indenyl) titanium dimethoxide; methylene (cyclopentadienyl) (fluorenyl) titaniumdimethoxide; ethylidene (cyclopentadienyl) (fluorenyl) titaniumdimethoxide; dimethyl silyl(cyclopentadienyl) (fluorenyl)titaniumdimethoxide; methylene(indenyl)(fluorenyl) titanium dimethoxide; ethylidene (indenyl) (fluorenyl)titaniumdimethoxide; dimethylsilyl (indenyl) (fluorenyl)titaniumdimethoxide etc.

The zirconium compound includes ethylidene biscyclopentadienylzirconiumdimethoxide, dimethylsilyl biscyclopentadienylzirconiumdimethoxide etc., and the hafnium compound includes ethylidenebiscyclopentadienyl hafniumdimethoxide, dimethylsilylbiscyclopentadienyl hafniumdimethoxide etc. Among these, the titanium compound is preferable.

In addition to these combinations, bidentate coordination type complexes such as 2,2'-thiobis(4-methyl-6-t-butylphenyl)titaniumdiisopropoxide; 2,2'-thiobis(4-methyl-6-t-butylphenoxide)titaniumdimethoxide etc. may be used.

In addition, the transition metal compound as component (a) includes at least one member selected from the group consisting of transition metal compounds having structures represented by the general formula (XII):

$$R'MX'_{p-1}L^1_q \quad (XII)$$

where R' is a π ligand and represents a condensed polycyclic cyclopentadienyl group where at least one many-membered ring having a cyclopentadienyl group bound to it by condensation is a saturated ring; X' is a σ ligand and a plurality of X' may be the same or different or may be bound to one another via an arbitrary group; $L^1$ is a Lewis base; p is valence number of M; q is 0, 1 or 2; and if a plurality of $L^1$ are present, $L^1$ may be the same or different.

In the general formula (XII) above, R' is a π ligand and represents a condensed polycyclic cyclopentadienyl group where at least one many-membered ring having a cyclopentadienyl group bound to it by condensation is a saturated ring. Such condensed polycyclic cyclopentadienyl group includes e.g. a member selected from the group consisting of condensed polycyclic cyclopentadienyl groups represented by the general formulae (XIII) to (XV):

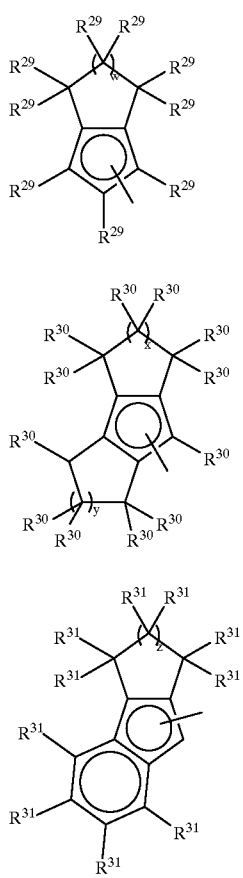

(XIII)

(XIV)

(XV)

where $R^{29}$, $R^{30}$ and $R^{31}$ independently represent a hydrogen atom, halogen atom, $C_1$ to $C_{20}$ aliphatic hydrocarbon group, $C_6$ to $C_{20}$ aromatic hydrocarbon group, $C_1$ to $C_{20}$ alkoxy group, $C_6$ to $C_{20}$ aryloxy group, $C_1$ to $C_{20}$ thioalkoxy group, $C_6$ to C20 thioaryloxy group, amino group, amide group, carboxyl group and alkylsilyl group; each of $R^{29}$, each of $R^{30}$, and each of $R^{31}$ may be the same or different; and w, x, y and z represent an integer of 1 or more. Among these, 4,5,6,7-tetrahydroindenyl group etc. are preferable for catalytic activity and easy synthesis.

Examples of R' are 4,5,6,7-tetrahydroindenyl group; 1-methyl-4,5,6,7-tetrahydroindenyl group; 2-methyl-4,5,6, 7-tetrahydroindenyl group; 1,2-dimethyl-4,5,6,7-tetrahydroindenyl group; 1,3-dimethyl-4,5,6,7-tetrahydroindenyl group; 1,2,3-trimethyl-4,5,6,7-tetrahydroindenyl group; 1,2,3,4,5,6,7-heptamethyl-4,5,6,7-tetrahydroindenyl group; 2,4,5,6,7-hexamethyl-4,5,6,7-tetrahydroindenyl group; 1,3,4,5,6,7-hexamethyl-4,5,6,7-tetrahydroindenyl group; octahydrofluorenyl group; 1,2,3,4-tetrahydrofluorenyl group; 9-methyl-1,2,3,4-tetrahydrofluorenyl group; octahydrofluorenyl group 9-methyl-octahydrofluorenyl group etc.

M represents the metals of groups 3 to 6 in the periodic table or lanthanum series metals and include titanium, zirconium, hafnium, lanthanum series metals, niobium and tantalum. Among these, titanium is preferable for catalyst activity. X' represents a σ ligand and includes a hydrogen atom, halogen atom, $C_1$ to $C_{20}$ aliphatic hydrocarbon group, $C_6$ to $C_{20}$ aromatic hydrocarbon group, $C_1$ to $C_{20}$ alkoxy group, $C_6$ to $C_{20}$ aryloxy group, $C_1$ to $C_{20}$ thioalkoxy group, $C_6$ to $C_{20}$ thioaryloxy group, amino group, amide group, carboxyl group and alkylsilyl group, and a plurality of X' may be the same or different and may be bound via an arbitrary group to one another. Examples of X' include a hydrogen atom, chlorine atom, bromine atom, iodine atom, methyl group, benzyl group, phenyl group, trimethylsilylmethyl group, methoxy group, ethoxy group, phenoxy group, thiomethoxy group, thiophenoxy group, dimethylamino group and disopropylamino group. L' represents a Lewis base; p is valence number of M; and q is 0, 1 or 2.

As the transition metal compounds represented by the general formula (XII), those containing a compound arbitrarily selected from the above exemplified groups of R' and X' can be preferably used.

The transition metal compounds represented by the general formula (XII) include, but are not limited to, 4,5,6,7-tetrahydroindenyltitaniumchloride; 4,5,6,7-tetrahydroindenyltitaniumtrimethyl; 4,5,6,7-tetrahydroindenyltitaniumtribenzyl; 4,5,6,7-tetrahydroindenyltrimethoxide; 1-methyl-4,5,6,7-tetrahydroindenyltitaniumtrichloride; 1-methyl-4,5,6,7-tetrahydroindenyltitaniumtrimethyl; 1-methyl-4,5,6,7-tetrahydroindenyltitaniumtribenzyl; 1-methyl-4,5,6,7-tetrahydroindenyltitaniumtrimethoxide; 2-methyl-4,5,6,7-tetrahydroindenyltitaniumtrichloride; 2-methyl-4,5,6,7-tetrahydroindenyltitaniumtrimethyl; 2-methyl-4,5,6,7-tetrahydroindenyltitaniumtribenzyl; 2-methyl-4,5,6,7-tetrahydroindenyltitaniumtrimethoxide; 1,2-dimethyl-4,5,6, 7-tetrahydroindenyltitaniumtrichloride; 1,2-dimethyl-4,5,6, 7-tetrahydroindenyltitaniumtrimethyl; 1,2-dimethyl-4,5,6,7-tetrahydroinenyltitaniumtribenzyl; 1,2-dimethyl-4,5,6,7-tetrahydroindenyltitaniumtrimethoxide; 1,3-dimethyl-4,5,6, 7-tetrahydroindenyltitaniumtrichloride; 1,3-dimethyl-4,5,6, 7-tetrahydroindenyltitaniurtrimethyl; 1,3-dimethyl-4,5,6,7-tetrahydroindenyltitaniumtribenzyl; 1,3-dimethyl-4,5,6,7-tetrahydroindenyltitaniumrtrimnethoxide; 1,2,3-trimethyl-4, 5,6,7-tetrahydroindenyltitanium trichloride; 1,2,3-trimethyl-4,5,6,7-tetrahydroindenyl titaniumtrimethyl; 1,2,3-trimethyl-4,5,6,7-tetrahydroindenyltitaniumtribenzyl; 1,2,3-trimethyl-4,5,6,7-tetrahydroindenyltitaniumtrimethoxide; 1,2,3,4,5,6,7-heptamethyl-4,5,6,7-tetrahydroindenyltitanium trichloride; 1,2,3,4,5,6,7-heptamethyl-4,5,6,7-tetrahydroindenyltitaniumtrimethyl; 1,2,3,4,5,6,7-heptamethyl-4,5,6,7-tetrahydroindenyltitaniumtribenzyl; 1,2,3,4,5,6,7-heptamethyl-4,5,6,7-tetrahydroindenyltitanium trimethoxide; 1,2,4,5,6,7-hexamethyl-4,5,6,7-tetrahydroindenyltitaniumtrichloride; 1,2,4,5,6,7-hexamethyl- 4,5,6,7-tetrahydroindenyltitaniumtrimethyl; 1,2,4,5,6,7-hexamethyl4,5,6,7-tetrahydroindenyltitanium tribenzyl; 1,2,4,5,6,7-hexamethyl-4,5,6,7-tetrahydroindenyl titaniumtrimethoxide; 1,3,4,5,6,7-hexamethyl-4,5,6,7-tetrahydroindenyltitaniumtrichloride; 1,3,4,5,6,7-hexamethyl-4,5,6, 7-tetrahydroindenyltitaniumtrimethyl; 1,3,4,5,6,7-hexamethyl-4,5,6, 7-tetrahydroindenyltitanium tribenzyl; 1,3,4,5,6,7-hexa-ethyl-4,5,6,7-tetrahydroindenyl titaniumtrimethoxide; 1,2,3,4,5,6,7,8-octahydrofluorenyl titaniumtrichloride; 1,2,3,4,5,6,7,8-octahydrofluorenyl titaniumtrimethyl; 1,2,3,4,5,6,7,8-octahydrofluorenyl titaniumtribenzyl; 1,2,3,4,5,6,7,8-octahydrofluorenyl titaniumtrimethoxide; 1,2,3,4-tetrahydrofluorenyltitanium trichloride;

1,2,3,4-tetrahydrofluorenyltitaniumtrimethyl; 1,2,3,4-tetrahydrofluorenyltitaniumtribenzyl; 1,2,3,4-tetrahydrofluorenyltitaniumtrimethoxide; 9-methyl-1,2,3,4-tetrahydrofluorenyltitaniumtrichloride; 9-methyl-1,2,3,4-tetrahydrofluorenyltitaniumtrimethyl; 9-methyl-1,2,3,4-tetrahydrofluorenyltitaniumtribenzyl; 9-methyl-1,2,3,4-tetrahydrofluorenyltitaniumtrimethoxide; 9-methyl-1,2,3,4,5,6,7,8-octahydrofluorenyltitanium trichloride; 9-methyl-1,2,3,4,5,6,7,8-octahydrofluorenyl titaniumtrimethyl; 9-methyl-1,2,3,4,5,6,7,8-octahydrofluorenyltitaniumtribenzyl; 9-methyl-1,2,3,4,5,6,7,8-octahydrofluorenyltitaniumtrimethoxide, and those compounds having zirconium or hafnium in place of titanium in these compounds, or their analogous compounds containing transition metals from other groups or lanthanide series transition metals. Among these, the titanium compounds are preferable for catalyst activity.

As component (b) used in the present invention, the compound (b1) capable of forming an ionic complex by reacting with a transition metal compound, and the specific oxygen-containing compound (b2), or a mixture thereof, is used.

The compound (b1) capable of forming an ionic complex by reacting with a transition metal compound includes a coordination complex compound consisting of an anion or cation having a plurality of groups bound to a metal, or a Lewis acid. The coordination complex compound consisting of an anion or cation having a plurality of groups bound to a metal includes those represented by e.g. the general formula (XVI) or (XVII):

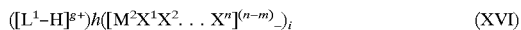  (XVI)

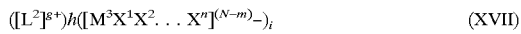  (XVII)

where $L^2$ is $M^4$, $R^{32}R^{33}M^5$ or $R^{34}{}_3C$ described below; $L^1$ is a Lewis base; $M^2$ and $M^2$ independently represent a metal selected from groups 5 to 15 in the periodic table; $M^4$ is a metal selected from groups 1 and 8 to 12 in the periodic table; $M^5$ is a metal selected from groups 8 to 10 in the periodic table; $X^1$ to $X^n$ independently represent a hydrogen atom, dialkylamino group, alkoxy group, aryloxy group, $C_1$ to $C_{20}$ alkyl group, $C_6$ to $C_{20}$ aryl group, alkylaryl group, arylalkyl group, substituted alkyl group, organometalloid group and halogen atom. $R^{32}$ and $R^{33}$ independently represent a cyclopentadienyl group, substituted cyclopentadienyl group, indenyl group and fluorenyl group; $R^{34}$ represents an alkyl group; m is an integer of 1 to 7 as valence of $M^2$ and $M^3$; n is an integer of 2 to 8; g is an integer of 1 to 7 as ionic valence of $[L^1–H]$ or $[L^2]$; h is an integer of 1 or more; and i=h×g/(n–m).

$M^2$ and $M^3$ include atoms such as B, Al, Si, P, As and Sb; $M^4$ includes atoms such as Ag, Cu, Na and Li; $M^5$ includes atoms such as Fe, Co and Ni. $X^1$ to $X^n$ include e.g. dialkylamino group such as dimethylamino group, diethylamino group etc., alkoxy group such as methoxy group, ethoxy group, n-butoxy group etc., aryloxy group such as phenoxy group, 2,6-dimethylphenoxy group, napthtyloxy group etc., $C_1$ to $C_{20}$ alkyl groups such as methyl group, ethyl group, n-propyl group, isopropyl group, n-butyl group, n-octyl group, 2-ethylhexyl group etc., $C_6$ to $C_{20}$ aryl group, alkylaryl group and arylalkyl group, such as phenyl group, p-tolyl group, benzyl group, pentafluorophenyl group, 3,5-di(trifluoromethyl)phenyl group, 4-tert-butylphenyl group, 2,6-dimethylphenyl group, 3,5-dimethylphenyl group, 2,4-dimethylphenyl group, 1,2-dimethylphenyl group etc., halogen such as F. Cl, Br and I, organometalloid group such pentamethylantimony group, trimethylsilyl group, trimethylgermyl group, diphenylarsine group, dicyclohexyl antimony group, diphenylboron group etc. The substituted cyclopentadienyl groups represented by $R^{32}$ and $R^{33}$ include e.g. a methylcyclopentadienyl group, butylcyclopentadienyl group, pentamethylcyclopentadienyl group etc.

The anion consisting of a plurality of groups bound to a metal includes $B(C_6F^5)_4^-$, $B(C_6HF_4)_4^-$, $B(C_6H_2F_2)_4^-$, $B(C_6H_3F2)_2^-$, $B(C_6H_4F)_4^-$, $B(C_6CF_3F_4)_4^-$, $BF_4^-$, $PF_6^-$, $P(C_6F_5)_6^-$ and $Al(C_6HF_4)_4^-$. The metal cation includes $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$ and $Li^+$. Other cations include nitrogen-containing compounds such as pyridium, 2,4-dinitro-N,N-diethylanilinium, diphenylammonium, p-nitroanilinium, 2,5-dichloroaniline, p-nitro-N,N-dimethylanilinium, quinolinium, N,N-dimethyl anilinium, N,N-diethylanilinium etc.; carbenium compounds such as triphenylcarbenium, tri(4-methylphenyl)carbenium, tri(4-methoxyphenyl)carbenium etc.; alkylphosphonium ions such as $CH_3PH_3^+$, $C_2H_5PH_3^+$, $C_3H_7PH_3^+$, $(CH_3)_2PH_2+$, $(C_2H_5)_2PH_2^+$, $(C_3H_7)_2PH_2^+(CH_3)_3PH^+$, $(C_2H_5)_3PH^+$, $(C_3H_7)_3PH^+$, $(CF_3)_3PH^+$, $(CH_3)_4P^+$, $(C_3H_4)_4P^+$, $(C_3H_7)_4P^+$ etc.; and arylphosphonium ions such as $C_6H_5PH_3^+(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$, $(C_2H_5)_2(C_6H_5)_2P^+$ etc.

As specific compounds of the general formulae (XVI) and (XVII), the following compounds can be preferably used. As compounds of (XVI), mention may be made of e.g. triethyl ammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridium tetrakis (pentafluorophenyl)borate pyrrolinium tetra (pentafluorophenyl)borate, N,N-dimethylanilinium tetrakis (pentafluorophenyl)borate, and methyldiphenylammonium tetrakis(pentafluorophenyl) borate. As compounds of the general formula (XVII), mention may be made of e.g. ferrocenium tetraphenylborate, dimethyl ferrocenium tetrakis(pentafluorophenyl)borate, ferrocenium tetrakis (pentafluorophenyl)borate, decamethylferrocenium tetrakis (pentafluorophenyl)borate, acetylferrocenium tetrakis (pentafluorophenyl)borate, formylferrocenium tetrakis (pentafluorophenyl)borate, cyanoferrocenium tetrakis (pentafluorophenyl)borate , silver tetraphenylborate, silver tetrakis(pentafluorophenyl) borate, trityl tetraphenylborate, trityl tetrakis(pentafluorophenyl)borate, silver hexafluoroarsenate, silver hexafluoroantimonate, and silver tetrafluoroborate.

As the Lewis acid, use can be made of e.g. $B(C_6F_5)_3$, $B(C_6HF_4)_3$, $B(C_6H_2F_3)_3$, $B(C_6H_3F_2)_3$, $B(C_6H_4F)_3$, $B(C_6CF_3F_4)_3$, $B(C_6F_5)_3BF_3$, $PF_5$, $P(C_6F_5)_5$ and $Al(C_6HF_4)_3$. The compounds capable of forming an ionic complex by reacting with a transition metal compound as the component (a) may be used singly or in combination.

The oxygen-containing compounds (b2) used are those with a chain structure represented by the general formula (III):

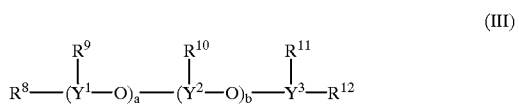  (III)

or by a circular structure represented the general formula

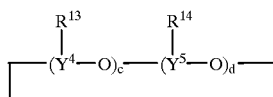

or a mixture thereof.

In the above general formulae (III) and (IV), $R^8$ to $R^{14}$ independently represent a $C_1$ to $C_8$ alkyl group and include a methyl group, ethyl group, n-propyl group, isopropyl group, various butyl groups, various pentyl groups, various hexyl groups, various heptyl groups and various octyl groups. $R^8$ to $R^{12}$ may be the same or different, and $R^{-}$and $R^{14}$ may be the same or different. $Y^1$ to $Y^5$ independently represent the elements of group 13 in the periodic table and include B, Al, Ga, In and Tl, among which B and Al are preferable. $Y^1$ to $Y^3$ may be the same or different, and $Y^4$ and $Y^5$ may be the same or different. a to d are independently a number of 0 to 50, where (a+b) and (c+d) are respectively 1 or more. a to d are preferably in the range of 1 to 20, preferably in the range of 1 to 5.

In the present invention, two or more oxygen-containing compounds as component (b2) may be used. As component (b), 1 or more kinds of component (b1) and 1 or more kinds of component (b2) can be used in combination.

In the present invention, an alkylating agent can be used as component (d) if necessary. The alkylating agent includes various compounds, and examples are alkyl group-containing aluminium compounds represented by the general formula (XVIII):

$$R^{35}{}_m Al(OR^{36})_n X_{3-m-n} \quad \text{(XVIII)}$$

where $R^{35}$ and $R^{36}$ independently represent a $C_1$ to $C_8$, preferably $C_1$ to C4 alkyl group; X represents a hydrogen atom or halogen atom; m is $0 < m \leq 3$, preferably 2 or 3, most preferably 3; and n is $0 \leq n < 3$, preferably 0 or 1, and alkyl group-containing magnesium compounds represented by the general formula (XIX):

$$R^{35}{}_2 Mg \quad \text{(XIX)}$$

where $R^{35}$ is as defined above, and alkyl group-containing zinc compounds represented by the general formula (XX)

$$R^{\pm}{}_2 Zn \quad \text{(XX)}$$

where $R^{\pm}$ is as defined above.

Among these alkyl group containing compounds, the alkyl group containing aluminium compounds a re preferred. Particularly trialkylaluminium and dialkylaluminium compounds are more preferred. Specifically, mention may be made of trialkylaluminum such as trimethylaluminium, triethylaluminium, tri-n-propylaluminium, trisopropyl aluminium, tri-n-butylaluminium, truisobutylaluminium, tri-t-butylaluminium etc., dialkylaluminiumhalide such as dimethylaluminiumchloride, diethylaluminiumchloride, di-n-propylaluminiumchloride, diisopropylaluminiumchloride, di-n-butylaluminiumchloride, diisobutylaluminiumchloride, di-t-butylaluminiumchloride etc., dialkylaluminiumalkoxide such as dimethylaluminiummethoxide, dimethylaluminium ethoxide etc., dialkylaluminiumhydride such as dimethyl aluminiumhydride, diethylaluminiumhydride, diisobutyl aluminiumhydride etc. Mention may be further made of dialkylmagnesium such as dimethylmagnesium, diethyl magnesium, di-n-propylmagnesium, diisopropylmagnesium etc. and dialkylzinc such as dimethylzinc, diethylzinc, di-n-propylzinc, diisopropylzinc etc.

In the present invention, a monomer is polymerized using a catalyst consisting of components (a), (b1) and/or (b2) and if necessary component (d), where use is made of a monomer to which an oxygen-containing compound having a branched alkyl group has previously been added as component (c). In the present invention, two or more types of oxygen-containing compounds may be used as component (c).

Regardless of whether a compound as component (b1) capable of forming an ionic complex by reacting with a transition metal compound or an oxygen-containing compound as component (b2), use is made of an oxygen-containing compound as component (c) represented by the general formula (I):

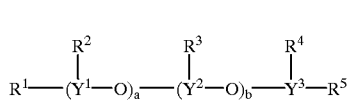

where $R^1$ to $R^5$ independently represent a $C_1$ to $C_8$ alkyl group, which may be the same or different and at least one of $R^1$ to $R^5$ must have a branched structure, and $Y^1$ to $Y^3$ independently represent the elements in group 13 in the periodic table and may be the same or different, and a and b independently represent a number of 0 to 50 whereupon a+b is 1 or more, or of an oxygen-containing compound represented by the general formula (II):

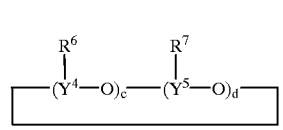

where $R^6$ and $R^7$ independently represent a $C_1$ to $C_8$ alkyl group, which may be the same or different and at least one of $R^6$ and $R^7$ must have a branched structure, and $Y^4$ and $Y^5$ independently represent the elements in group 13 in the periodic table and may be the same or different, and c and d independently represent a number of 0 to 50 whereupon c+d is 1 or more, or of a mixture thereof. Preferable examples of such oxygen-containing compounds include tetraisopropylaluminoxane, tetraisobutylaluminoxane, tetra-t-butylaluminoxane, pentaisobutylaluminoxane, penta-t-butyl aluminoxane, hexaisobutylaluminoxane, hexa-t-butyl aluminoxane, heptaisobutylaluminoxane, hepta-t-butyl aluminoxane, octaisobutylaluminoxane, octa-t-butyl aluminoxane, nonaisobutylaluminoxane, nona-t-butyl aluminoxane, decaisobutylaluminoxane, deca-t-butyl aluminoxane etc. Among these, tetraisobutylaluminoxane, tetra-t-butylaluminoxane, pentaisobutylaluminoxane and penta-t-butylaluminoxane are preferable.

Their amount added to a monomer, in terms of their molar ratio to styrene, is styrene:aluminoxane=350,000:2,000 to 1, preferably 350,000 : 1,000 to 1, more preferably 350,000 : 800 to 1.

In the present invention, all or a part of, an alkylating agent optionally used as component (d) may have previously been added to a monomer. In this case, its ratio in the monomer may be suitably determined depending on the content of impurities in the monomer. As preferably used component (d), mention is made of triisobutyl aluminium, triethylaluminium, triisopropylaluminium, and trimethylaluminium.

To carry out the process of the present invention, (a), (b1) and/or (b2) and optionally used (d) as the catalyst components may be added separately to a monomer to which all or a part of components (c) and (d) have previously been added, or the respective catalyst components may be preliminarily mixed with solvent (aromatic hydrocarbons such as toluene, ethylbenzene etc. or aliphatic hydrocarbons such as hexane, heptane etc.) before being mixed with a monomer. Regardless of whether the respective catalyst components are to be added separately or previously mixed, all or a part of component (c) or components (c) and (d) should be added to a monomer before the catalyst components are added.

The temperature for the previous introduction of all or a part of the above-described component (c) or components (c) and (d) into a monomer may be room temperature or any other arbitrary temperatures. Further, the step of preliminarily mixing components (a), (b1) and/or (b2) and optionally used component (d) can be effected at a polymerization temperature or at a temperature of 0 to 100° C.

To produce a polymer according to the process of the present invention, aromatic vinyl compounds such as styrene and/or styrene derivatives, olefins such as ethylene, propylene etc., dienes such as butadiene, isoprene etc., alkynes such as acetylene etc. and cyclic olefins are used as monomers. Among these, aromatic vinyl compounds such as styrene and/or styrene derivatives etc. are preferably used. These monomers can also be used singly or in combination.

Preferably used styrene type monomers are compounds represented by the general formula (XXI):

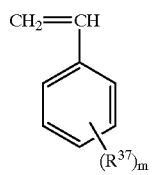

(XXI)

where $R^{37}$ represents a hydrogen atom, halogen atom or $C_{20}$ or less hydrocarbon group; m is an integer of 1 to 3; if m is 2 or more, each of $R^{37}$ may be the same or different, and examples of such monomers are alkyl styrene such as styrene, p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, p-tert-butylstyrene etc.; vinylbenzene such as p-divinylbenzene, m-divinylbenzene, trivinylbenzene etc.; halogenated styrene such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene etc.; alkoxystyrene such as methoxystyrene, ethoxystyrene, t-butoxystyrene etc.; or a mixture thereof.

If the styrene type monomer is used as a monomer, the monomer may be polymerized by bulk polymerization or in a solvent e.g. aliphatic hydrocarbons such as pentane, hexane, heptane etc., alicyclic hydrocarbons such as cyclohexane etc. or aromatic hydrocarbons such as benzene, toluene, xylene etc. The polymerization temperature is not particularly limited, generally ranging from 0 to 120° C., preferably 20 to 90° C.

To regulate the molecular weight of the resulting styrene type polymer, the polymerization reaction may be carried out in the presence of hydrogen.

The styrene type polymer thus obtained has a high degree of a syndiotactic structure. In the styrene type polymer, a high degree of a syndiotactic structure means a high degree of a syndiotactic structure in stereochemistry, that is, a side chain of phenyl groups and substituted phenyl groups forms a stereostructure in which they are located at the opposite side alternately relative to the main chain of a carbon-carbon bond, and the tacticity can be quantitatively determined by nuclear magnetic resonance using carbon isotope ($^{13}$C-NMR). The tacticity determined by $^{13}$C-NMR can be expressed as dyad when the number of a plurality of continuous constituent units is 2, as triad when the number is 3, and as pentad when the number is 5, and the phrase "styrene type polymer having a high degree of a syndiotactic structure" in the present invention refers to polystyrene, poly(alkylstyrene), poly(halogenated styrene) and poly (alkoxystyrene), poly(vinylbenzoate) usually having a syndiotacticity of 75% or more racemic dyad, preferably 85% or more, or 30% or more racemic pentad, preferably 50% or more, as well as a mixture thereof, or polymers based thereon. The above poly(alkylstyrene) includes poly (methylstyrene), poly(ethylstyrene), poly(isopropylstyrene), poly(tert-butylstyrene) etc. The poly(halogenated styrene) includes poly(chlorostyrene), poly(bromostyrene), poly (fluorostyrene) etc. The poly(alkoxystyrene) includes poly (methoxystyrene), poly(ethoxystyrene) etc. Particularly preferable styrene type polymers among these are polystyrene, poly(p-methylstyrene), poly(m-methylstyrene), poly(p-tert-butylstyrene), poly(p-chlorostyrene), poly(m-chlorostyrene) and poly(p-fluorostyrene), as well as styrene/p-methylstyrene copolymers.

EXAMPLES

Hereinafter, the present invention is described specifically by reference to examples and comparative examples, which however, shall not be construed to limit the present invention thereto.

EXAMPLE 1

43 ml toluene, 150 μmol dimethylanilinium tetra (pentafluorophenyl) borate, 150 μmol pentamethyl cyclopentadienyltitaniumtrimethoxide, and 3.0 mmol triisobutylaluminium were mixed in a 50-ml dried vessel in a nitrogen atmosphere at room temperature to prepare 50 ml of a preliminarily mixed catalyst.

10 ml styrene, 125 μmol tetraisobutylaluminoxane (produced by Nippon Alkyl Alumi Co., Ltd.) and 5 μmol triisobutylaluminium were introduced into a 30-ml dried vessel in a nitrogen atmosphere and sealed. It was heated to 70° C. and 83.3 μl of the above preliminarily mixed catalyst was added. The mixture was polymerized at 70° C. for 1 hour. After the reaction was finished, the product was removed from the reaction vessel and dried under reduced pressure for removing the styrene which was not reacted was removed. 3.40 g of syndiotactic polystyrene (SPS) was obtained in this manner (SPS activity: 286 kg/gTi). From its melting point and $^{13}$C-NMR, it was confirmed that the resulting polymer is SPS. The catalyst, monomer and polymerization results are shown in Table 1.

EXAMPLE 2

3.35 g of syndiotactic polystyrene (SPS) was obtained in the same manner as in Example 1 except that triihsobutyl aluminium was not added to styrene in polymerization of styrene (SPS activity: 281 kg/gTi). From its melting point and $^{13}$C-NMR, it was confirmed that the resulting polymer is SPS. The catalyst, monomer and polymerization results are shown in Table 1.

EXAMPLE 3

2.83 g of syndiotactic polystyrene (SPS) was obtained in the same manner as in Example 1 except that the amount of tetraisobutylaluminoxane added to styrene was 30 μmol in polymerization of styrene (SPS activity: 220 kg/gTi) From its melting point and $^{13}$C-NMR, it was confirmed that the resulting polymer is SPS. The catalyst, monomer and polymerization results are shown in Table 1.

EXAMPLE 4

3.48 g of syndiotactic polystyrene (SPS) was obtained in the same manner as in Example 1 except that 3.0 mmol tetraisobutylaluminoxane was further added in preparation of a preliminarily mixed catalyst (SPS activity: 291 kg/gTi). From its melting point and $^{13}$C-NMR, it was confirmed that the resulting polymer is SPS. The catalyst, monomer and polymerization results are shown in Table 1.

EXAMPLE 5

43 ml toluene, 3.0 mmol tetraisobutylaluminoxane (produced by Nippon Alkyl Alumi Co., Ltd.) and 150 μmol pentamethylcyclopentadienyltitaniummethoxide were mixed in a 50-ml dried vessel in a nitrogen atmosphere at room temperature to prepare 50 ml of a preliminarily mixed catalyst.

10 ml styrene and 125 μmol tetraisobutylaluminoxane (produced by Nippon Alkyl Alumi Co., Ltd.) were introduced into a 30-ml dried vessel in a nitrogen atmosphere and sealed. It was heated to 70° C. and 83.3 μl of the above preliminarily mixed catalyst was added. The mixture was polymerized at 70° C. for 1 hour. After the reaction was finished, the product was removed from the reaction vessel and dried under reduced pressure for removing the styrene which was not reacted. In this manner, 0.02 g of syndiotactic polystyrene (SPS) was obtained (SPS activity: 2 kg/gTi). From its melting point and $^{13}$C-NMR, it was confirmed that the resulting polymer is SPS. The catalyst, monomer and polymerization results are shown in Table 1.

EXAMPLE 6

3.3 g of syndiotactic polystyrene (SPS) was obtained in the same manner as in Example 1 except that pentaisobutylaluminoxane was used in place of tetraisobutyl aluminoxane (SPS activity: 278 kg/gTi). From its melting point and $^{13}$C-NMR, it was confirmed that the resulting polymer is SPS. The catalyst, monomer and polymerization results are shown in Table 1.

COMPARATIVE EXAMPLE 1

1.81 g of syndiotactic polystyrene (SPS) was obtained in the same manner as in Example 1 except that tetraisobutylaluminoxane was not added to styrene in polymerization of styrene (SPS activity: 152 kg/gTi). From its melting point and $^{13}$C-NMR, it was confirmed that the resulting polymer is SPS. The catalyst, monomer and polymerization results are shown in Table 1.

COMPARATIVE EXAMPLE 2

1.50 g of syndiotactic polystyrene (SPS) was obtained in the same manner as in Example 1 except that triisobutyl aluminium and tetraisobutylaluminoxane were not added to styrene in polymerization of styrene (SPS activity: 126 kg/gTi). From its melting point and $^{13}$C-NMR, it was confirmed and $^{13}$C-NMR that the resulting polymer is SPS. The catalyst, monomer and polymerization results are shown in Table 1.

COMPARATIVE EXAMPLE 3

1.78 g of syndiotactic polystyrene (SPS) was obtained in the same manner as in Example 1 except that tetraisobutylaluminoxane was not added to styrene and that the amount of triisobutylaluminium was 25 μmol (SPS activity: 149 kg/gTi). From its melting point and $^{13}$C-NMR, it was confirmed that the resulting polymer is SPS. The catalyst, monomer and polymerization results are shown in Table 1.

COMPARATIVE EXAMPLE 4

2.08 g of syndiotactic polystyrene (SPS) was obtained in the same manner as in Example 1 except that 75 mmol tetraisobutylaluminoxane was further added in preparation of a preliminarily mixed catalyst and that tetraisobutyl aluminoxane was not added to styrene in polymerization of styrene (SPS activity: 175 kg/gTi). From its melting point and $^{13}$C-NMR, it was confirmed that the resulting polymer is SPS. The catalyst, monomer and polymerization results are shown in Table 1.

COMPARATIVE EXAMPLE 5

43 ml toluene, 150 μmol pentamethylcyclopentadienyl titaniumtrimethoxide, and 75 mmol tetraisobutylaluminoxane and 3.0 mmol triisobutylaluminium used in Example 1, were mixed in a 50-ml dried vessel in a nitrogen atmosphere at room temperature to prepare 50 ml of a preliminarily mixed catalyst.

10 ml styrene and 5 μmol triisobutylaluminium were introduced into a 30-ml dried vessel in a nitrogen atmosphere and sealed. It was heated to 70° C. and 83.3 μl of the above preliminarily mixed catalyst was added. The mixture was polymerized at 70° C. for 1 hour. After the reaction was finished, the product was removed from the reaction vessel and dried under reduced pressure for removing the styrene which was not reacted. In this manner, 0.10 g of syndiotactic polystyrene (SPS) was obtained (SPS activity: 1 kg/gTi). From its melting point and $^{13}$C-NMR, it was confirmed that the resulting polymer is SPS. The catalyst, monomer and polymerization results are shown in Table 1.

TABLE 1

| | Addition to Monomer | | | | Each Component in Catalyst | | | | | | Polymerization | |
|---|---|---|---|---|---|---|---|---|---|---|---|---|
| | Component (c) | | Component (d) | | Component (a) | | Component (b1) or (b2) | | Component (d) | | | |
| | Type | Amount (μmol) | Type | Amount (μmol) | Type | Amount (μmol) | Type | Amount (μmol) | Type | Amount (μmol) | Yield (g) | Activity (kg/gTi) |
| Example 1 | IBAO | 125 | TIBA | 5 | Cp* Ti(OMe)₃ | 0.25 | DMAB((b1)) | 0.25 | TIBA | 5 | 3.40 | 286 |
| Example 2 | IBAO | 125 | — | 0 | Cp* Ti(OMe)₃ | 0.25 | DMAB((b1)) | 0.25 | TIBA | 5 | 3.35 | 281 |
| Example 3 | IBAO | 30 | TIBA | 5 | Cp* Ti(OMe)₃ | 0.25 | DMAB((b1)) | 0.25 | TIBA | 5 | 2.63 | 220 |
| Example 4 | IBAO | 125 | TIBA | 5 | Cp* Ti(OMe)₃ | 0.25 | DMAB((B1)) IBAO((b2)) | 0.25 5 | TIBA | 5 | 3.48 | 291 |
| Example 5 | IBAO | 125 | — | 0 | Cp* Ti(OMe)₃ | 0.25 | IBAO((b2)) | 5 | — | 0 | 0.02 | 2 |
| Example 6 | PBAO | 125 | TIBA | 5 | Cp* Ti(OMe)₃ | 0.25 | DMAB((b1)) | 0.25 | TIBA | 5 | 3.30 | 278 |
| Comparative Example 1 | — | 0 | TIBA | 5 | Cp* Ti(OMe)₃ | 0.25 | DMAB((b1)) | 0.25 | TIBA | 5 | 1.81 | 152 |
| Comparative Example 2 | — | 0 | — | 0 | Cp* Ti(OMe)₃ | 0.25 | DMAB((b1)) | 0.25 | TIBA | 5 | 1.50 | 126 |
| Comparative Example 3 | — | 0 | TIBA | 25 | Cp* Ti(OMe)3 | 0.25 | DMAB((b1)) | 0.25 | TIBA | 5 | 1.78 | 149 |
| Comparative Example 4 | — | 0 | TIBA | 5 | Cp* Ti(OMe)₃ | 0.25 | DMAB((b1)) IBAO((b2)) | 0.25 125 | TIBA | 5 | 2.08 | 175 |
| Comparative Example 5 | — | 0 | TIBA | 5 | Cp* Ti(OMe)₃ | 0.25 | IBAO((b2)) | 125 | TIBA | 5 | 0.01 | 1 |

[Note]
IBAO: tetraisobutylaluminoxane
PBAO: pentaisobutylaluminoxane
TIBA: triisobutylaluminium
Cp* Ti(OMe)₃: pentamethylcyclopentadienyltitaniumtrimethoxide
DMAB: dimethylanilium tetrakis(pentafluorophenyl)borate It was confirmed from the foregoing examples and Table 1 that a styrene type polymer having a high degree of a syndiotactic structure can be produced efficiently in Examples 1 to 5 and Example 6. On the other hand, it was confirmed that activity was low in Comparative Examples 1 to 5 where component (c) was not added to the monomer.

The comparison between Example 5 and Comparative Example 5 where only (b2) was used as a catalyst component indicated that the activity in the latter the catalyst was significantly low even if component (d) was added, while the activity in the former was higher than the latter even if component (d) was not added. From this, the improvement of activity by addition of component (c) is confirmed.

As described above in detail, high activity can be obtained for production of a polymer, particularly a styrene type polymer having a high degree of a syndiotactic structure by subjecting to a polymerization a monomer to which an specific oxygen-containing compound, or an specific oxygen-containing compound and all or a part of an alkylating agent, have been previously added according to the present invention. Further, production costs can be reduced according to the process of the present invention.

What is claimed is:

1. A method of producing a polymer, comprising:
preparing a catalyst comprising (a) a titanium compound
(i) of the formula: TiRXYZ, wherein R is a cyclopentadienyl group, a substituted cylcopentadienyl group, an indenyl group, a substituted indenyl group or a fluorenyl group and X, Y and Z are each independently hydrogen, a $C_1$–$C_{20}$-alkyl group, a $C_1$–$C_{20}$-alkoxy group, a $C_6$–$C_{20}$-alkyl group, an alkylaryl group, an arylalkyl group, a $C_6$–$C_{20}$-aryloxy group, a $C_1$–$C_{20}$-acyloxy group, a $C_1$–$C_{50}$-amino group, an amide group, a phosphide group, an alkylthio group, an arylthio group or halogen or X, Y or Z is cross-linked to R by $CH_2$ or $SiR_2$, wherein $R_2$ is $C_1$–$C_8$-alkyl; or a compound (ii) of the formula: R'TiX'₃L¹$_q$, wherein R' is a π ligand and is a condensed polycyclic cyclopentadienyl group in which at least one many membered ring having a cyclopentadienyl group bound to it by condensation is a saturated ring; each of the three X' groups is a σ ligand, which may be the same or different; $L^1$ is a Lewis base and q is 0, 1 or 2; and (1) a borate compound which is capable of reacting with component (a) to form an ionic complex selected from the group consisting of triethylammonium tetraphenylborate, tri(n-butyl)ammonium tetraphenylborate, trimethylammonium tetraphenylborate, triethylammonium tetrakis (pentafluorophenyl)borate, tri(n-butyl)ammonium tetrakis(pentafluorophenyl)borate, triethylammonium hexafluoroarsenate, pyridium tetrakis (pentafluorophenyl)borate, pyrrolinium tetra (pentafluorophenyl)borate, N,N-dimethylanilinium tetrakis(pentafluorophenyl)borate, methyldiphenylammonium tetrakis(pentafluorophenyl)borate, ferrocenium tetraphenylborate, dimethylferrocenium tetrakis (pentafluorophenyl)borate, ferrocenium tetrakis (pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanofeirocenium tetrakis(pentafluorophenyl)borate, silver tetraphenylborate, silver tetrakis(pentafluorophenyl) borate, trityl tetraphenylborate and trityl tetrakis (pentafluorophenyl)borate;

mixing said catalyst with at least one aromatic vinyl compound monomer and which monomer has previously been mixed with a component (c) which is at least one oxygen-containing aluminoxane compound selected from the group consisting of tetraisopropylaluminoxane, tetraisobutylaluminoxane, tetra-t-butylaluminoxane, pentaisobutylaluminoxane, penta-t-butylaluminoxane, hexaisobutylaluminoxane, hexa-t-butylaluminoxane, heptaisobutylaluminoxane, hepta-t-butylaluminoxane, octaisobutylaluminoxane, octa-t-butylaluminoxane, nonaisobutylaluminoxane, nona-t-butylaluminoxane, decaisobutylaluminoxane, and deca-t-butylaluminoxane, wherein the molar ratio of said monomer to aluminoxane ranges from 350,000:1000 to 350,000:1; and polymerizing the monomer(s).

2. A method of producing a polymer, comprising:

preparing a catalyst comprising (a) a titanium compound (i) of the formula: TiRXYZ, wherein R is a cyclopentadienyl group, a substituted cylcopentadienyl group, an indenyl group, a substituted indenyl group or a fluorenyl group and X, Y and Z are each independently hydrogen, a $C_1$–$C_{20}$-alkyl group, a $C_1$–$C_{20}$-alkoxy group, a $C_6$–$C_{20}$-alkyl group, an alkylaryl group, an arylalkyl group, a $C_6$–$C_{20}$-aryloxy group, a $C_1$–$C_{20}$-acyloxy group, a $C_1$–$C_{50}$-amino group, an amide group, a phosphide group, an alkylthio group, an arylthio group or halogen or X, Y or Z is cross-linked to R by $CH_2$ or $SiR_2$, wherein $R_2$ is $C_1$–$C_8$-alkyl; or a compound (ii) of the formula: $R'TiX'_3L^1_q$, wherein R' is a π ligand and is a condensed polycyclic cyclopentadienyl group in which at least one many membered ring having a cyclopentadienyl group bound to it by condensation is a saturated ring; each of the three X' groups is a σ ligand, which may be the same or different; $L^1$ is a Lewis base and q is 0, 1 or 2; and (b1) a borate compound which is capable of reacting with component (a) to form an ionic complex selected from the group consisting of triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridium tetrakis(pentafluorophenyl)borate, pyrrolinium tetra(pentafluorophenyl)borate, N,N-dimethylanilinium tetrakis(pentafluorophenyl)borate, methyldiphenylammonium tetrakis(pentafluorophenyl)borate, ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate and trityl tetrakis(pentafluorophenyl)borate; and (b2) an aluminoxane compound of formula (III):

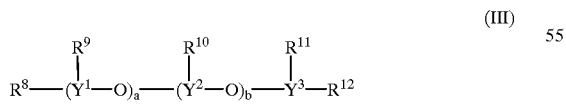

(III)

wherein $R^8$–$R^{12}$, which may be the same or different, independently represent an alkyl group containing from 1–8 carbon atoms; $Y^1$–$Y^3$, which may be the same or different, independently represent an element of Group 13 of the Periodic Table; and a and b independently represent a number of from 0–50, and the sum of a and b is 1 or more, and/or an oxygen-containing compound of formula (IV):

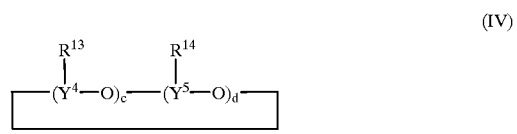

(IV)

wherein $R^{13}$ and $R^{14}$, which may be the same or different, independently represent an alkyl group containing from 1–8 carbon atoms; $Y^4$ and $Y^5$, which may be the same or different, independently represent an element of Group 13 of the Periodic Table; and c and d independently represent a number of from 0–50, and the sum of c and d is 1 or more;

mixing said catalyst with an aromatic vinyl compound monomer, which monomer has been previously mixed with a component (c), which is at least one oxygen-containing aluminoxane compound selected from the group consisting of:

tetraisopropylaluminoxane, tetraisobutylaluminoxane, tetra-t-butylaluminoxane, pentaisobutylaluminoxane, penta-t-butylaluminoxane, hexaisobutylaluminoxane, hexa-t-butylaluminoxane, heptaisobutylaluminoxane, hepta-t-butylaluminoxane, octaisobutylaluminoxane, octa-t-butylaluminoxane, nonaisobutylaluminoxane, nona-t-butylaluminoxane, decaisobutylaluminoxane, and deca-t-butylaluminoxane, wherein the molar ratio of said monomer to aluminoxane ranges from 350,000:1000 to 350,000:1; and polymerizing the monomer(s).

3. A method of producing a polymer, comprising:

preparing a catalyst comprising (a) a titanium compound (i) of the formula: TiRXYZ, wherein R is a cyclopentadienyl group, a substituted cylcopentadienyl group, an indenyl group, a substituted indenyl group or a fluorenyl group and X, Y and Z are each independently hydrogen, a $C_1$–$C_{20}$-alkyl group, a $C_1$–$C_{20}$-alkoxy group, a $C_6$–$C_{20}$-alkyl group, an alkylaryl group, an arylalkyl group, a $C_6$–$C_{20}$-aryloxy group, a $C_1$–$C_{20}$-acyloxy group, a $C_1$–$C_{50}$-amino group, an amide group, a phosphide group, an alkylthio group, an arylthio group or halogen or X, Y or Z is cross-linked to R by $CH_2$ or $SiR_2$, wherein $R_2$ is $C_1$–$C_8$-alkyl; or a compound (ii) of the formula: $R'TiX'_3L^1_q$, wherein R' is a π ligand and is a condensed polycyclic cyclopentadienyl group in which at least one many membered ring having a cyclopentadienyl group bound to it by condensation is a saturated ring; each of the three X' groups is a σ ligand, which may be the same or different; $L^1$ is a Lewis base and q is 0, 1 or 2; and (b2) an aluminoxane of formula (III):

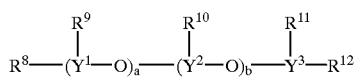

wherein $R^8$–$R^{12}$, which may be the same or different, independently represent an alkyl group containing from 1–8 carbon atoms; $Y^1$–$Y^3$, which may be the same or different, independently represent an element of Group 13 of the Periodic Table; and a and b independently represent a number of from 0–50, and the sum of a and b is 1 or more, and/or an oxygen-containing compound of formula (IV):

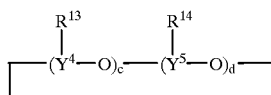

wherein $R^{13}$ and $R^{14}$, which may be the same or different, independently represent an alkyl group containing from 1–8 carbon atoms; $Y^4$ and $Y^5$, which may be the same or different, independently represent an element of Group 13 of the Periodic Table; and c and d independently represent a number of from 0–50, and the sum of c and d is 1 or more;

mixing said catalyst with at least one aromatic vinyl compound monomer, which monomer has previously been mixed with a component (c) which is at least one oxygen-containing aluminoxane compound selected from the group consisting of: tetraisopropylaluminoxane, tetraisobutylaluminoxane, tetra-t-butylaluminoxane, pentaisobutylaluminoxane, penta-t-butylaluminoxane, hexaisobutylaluminoxane, hexa-t-butylaluminoxane, heptaisobutylaluminoxane, hepta-t-butylaluminoxane, octaisobutylaluminoxane, octa-t-butylaluminoxane, nonaisobutylaluminoxane, nona-t-butylaluminoxane, decaisobutylaluminoxane, and deca-t-butylaluminoxane, wherein the molar ratio of said monomer to aluminoxane ranges from 350,000:1000 to 350,000:1; and polymerizing the monomer(s).

4. The process as claimed in claim 1, wherein the molar ratio of said monomer to aluminoxane ranges from 350,000:2,000 to 350,000:1.

5. The process as claimed in claim 2, wherein the molar ratio of said monomer to aluminoxane ranges from 350,000:2,000 to 350,000:1.

6. The process as claimed in claim 3, wherein the molar ratio of said monomer to aluminoxane ranges from 350,000:2,000 to 350,000:1.

7. The method as claimed in claim 1, wherein said catalyst further comprises (d) a trialkylaluminum agent.

8. The method as claimed in claim 1, wherein said catalyst further comprises (d) a trialkylaluminum agent.

9. The method as claimed in claim 3, wherein said catalyst further comprises (d) a trialkylaluminum agent.

10. The process as claimed in claim 7, wherein said alkylating agent (d) is combined with said monomer before mixing with said catalyst.

11. The process as claimed in claim 8, wherein said alkylating agent (d) is combined with said monomer before mixing with said catalyst.

12. The process as claimed in claim 9, wherein said alkylating agent (d) is combined with said monomer before mixing with said catalyst.

13. The process as claimed in claim 7, wherein a portion of an alkylating agent (d) to be combined with said monomer, is combined with the monomer before mixing with said catalyst.

14. The process as claimed in claim 8, wherein a portion of an alkylating agent (d) to be combined with said monomer, is combined with the monomer before mixing with said catalyst.

15. The process as claimed in claim 9, wherein a portion of an alkylating agent (d) to be combined with said monomer, is combined with the monomer before mixing with said catalyst.

16. The process as claimed in claim 1, wherein the molar ratio of aromatic vinyl monomer to aluminoxane ranges from 350,000:2000 to 350,000:1.

17. The process as claimed in claim 2, wherein the molar ratio of aromatic vinyl monomer to aluminoxane ranges from 350,000:2000 to 350,000:1.

18. The process as claimed in claim 3, wherein the molar ratio of aromatic vinyl monomer to aluminoxane ranges from 350,000:2000 to 350,000:1.

19. The process as claimed in claim 16, wherein said ratio is 350,000:2000 to 350,000:120.

20. The process as claimed in claim 17, wherein said ratio is 350,000:2000 to 350,000:120.

21. The process as claimed in claim 18, wherein said ratio is 350,000:2000 to 350,000:120.

22. A method of producing a polymer, comprising:

preparing a catalyst comprising (a) a titanium compound and (b1) a compound capable of reacting with component (a) to form an ionic complex and/or (b2) an aluminoxane compound of formula (III):

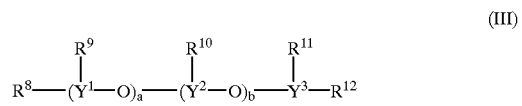

wherein $R^8$–$R^{12}$, which may be the same or different, independently represent an alkyl group containing from 1–8 carbon atoms; $Y^1$–$Y^3$, which may be the same or different, independently represent an element of Group 13 of the Periodic Table; and a and b independently represent a number of from 0–50, and the sum of a and b is 1 or more, and/or an oxygen-containing compound of formula (IV):

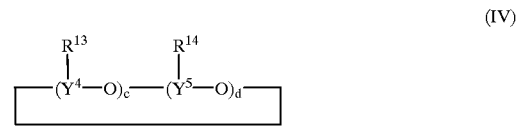

wherein $R^{13}$ and $R^{14}$, which may be the same or different, independently represent an alkyl group containing from 1–8 carbon atoms; $Y^4$ and $Y^5$, which may be the same or different, independently represent an element of Group 13 of the Periodic Table; and c and d independently represent a number of from 0–50, and the sum of c and d is 1 or more;

mixing said catalyst with at least one aromatic vinyl compound monomer and which monomer has previously been mixed with a component (c) which is at least one oxygen-containing aluminoxane compound selected from the group consisting of tetraisopropylaluminoxane, tetraisobutylaluminoxane, tetra-t-butylaluminoxane, pentaisobutylaluminoxane, penta-t-butylaluminoxane, hexaisobutylaluminoxane, hexa-t-butylaluminoxane, heptaisobutylaluminoxane, hepta-t-butylaluminoxane, octaisobutylaluminoxane, octa-t-butylaluminoxane, nonaisobutylaluminoxane, nona-t-butylaluminoxane, decaisobutylaluminoxane, and deca-t-butylaluminoxane; wherein the mole ratio of aromatic vinyl monomer to aluminoxane (c) ranges from 350,000:2000 to 350,000:1; and polymerizing the monomer (s).

* * * * *